Patented Nov. 21, 1933

1,935,972

UNITED STATES PATENT OFFICE 1,935,972

METHOD OF HARVESTING ONIONS

Roscoe C. Zuckerman, Stockton, Calif.

No Drawing. Application November 12, 1929
Serial No. 406,725

4 Claims. (Cl. 99—11)

This invention relates to a new and improved method of harvesting onions from the field where they are grown and properly preparing them for market. In this respect it is necessary that the onions be harvested, the tops removed and the onions properly cured so that they may be sacked, sorted, graded or otherwise put into suitable containers, all of which must be done before shipment, sale and consumption thereof is possible without intermediate deterioration.

Heretofore the common method of harvesting onions has consisted in three tedious operations, as follows: At maturity or while the onions are still growing they are pulled from the ground. The pulled onions are then placed in windrows, care being taken that the bulbs of the onions with long roots clinging thereto are placed in direct contact with the ground with the tops of the onions extending upwardly. The onions are allowed to remain in these windrows until the tops dry and wither and the onions properly dry out and cure.

When the tops are suitably dry and the onions cured in the manner stated, the onions are then removed from the windrow by hand or otherwise and the dried tops are cut off of the same. The onions are then suitably sorted, graded and placed in containers, which operation is carried out either by hand or otherwise, as is found most desirable.

The foregoing method of harvesting the onions has proven very unsatisfactory in practice, exceedingly costly and thoroughly inadequate to meet the needs of the producer for various reasons. One of these is that the onions placed in the center of the windrows and in direct contact with the moist soil will not cure to the same degree as the onions on the outside of the windrow. Furthermore during periods of extreme heat the onions on the outside of the windrow are subject to the direct rays of the sun and heavy losses occur from sunburn. The cost of harvesting according to the old method above described is so great that in years of normal or heavy production it is impossible to raise onions and harvest and sack them at a profit, and very often the cost of production, due to such costly method of harvesting, is above the selling price.

By my improved method I propose to eliminate at least one of the above described operations, that is the pulling of the onions and placing them in windrows, which often costs as much as $25.00 per acre, and I also aim to materially reduce the cost of topping and grading and sorting the onions.

Describing now my improved method of harvesting the onions I first cut the tops of the onions while they are still in the ground, which cutting may be done by hand or machinery in a rapid and effective manner.

The onions are then lifted from the ground by any convenient means, preferably by means of a mechanically operated machine. As the onions are being lifted from the ground and before they are out of the same the roots are cut off at a predetermined length and the onions are relieved of the dirt clinging to them and are passed into sacks or other suitable containers. As the sacks are filled with onions they are placed in suitable and segregated relation in the field and allowed to stand in such segregated relation a sufficient length of time to allow the onions in the sack to dry and cure, which time limit is usually from two to six days, depending upon weather conditions.

The tops of the onions being cut while they are still in the ground, there are stems left above the top of the bulb, usually of a length of from one to two inches. These stems are still green and full of moisture, which moisture is dried out in the above manner while the sacks are left in the segregated relation for the time stated. The drying out and curing of the onions in this manner is hastened by the fact that the onions in such containers are protected from the direct and burning rays of the sun but are so placed that they are subject to the full influence of the heat generated by the sun, and the containers thmselves being of a foraminous material, such as sacking or the like, permit the passage of wind and air therethrough. The irregularities of the onions as placed in the sacks readily permit of the drying wind and air to freely percolate therethrough. For these reasons the functions of drying and curing the onions is very effectively carried out.

After the onions in the containers have remained in the field a sufficient length of time to allow the above curing process to take place effectively they are then resacked into containers and made ready for or shipped to market, or stored for later use.

As above pointed out, my improved method entirely does away with the old time step of hand pulling and windrowing the onions with the consequent expense and deleterious effects, and also permits of a quicker and less expensive method of topping the onions, and furthermore the curing process involved in my new method is both quicker, less expensive and more effective and entirely avoids the sunburning of the onions.

Having thus described my invention what I claim as new and useful and desire to secure by Letters Patent is:

1. The herein described method of harvesting onions consisting in topping the onions while they are still in the ground and the tops are still green, and then removing them from the ground and placing them in containers through which light and air may circulate, and leaving the containers in segregated relation and open to the elements for a length of time sufficient to cure the same.

2. The herein described method of harvesting onions comprising topping the onions while they are still in the ground and the tops are still green, removing them from the ground and depositing them in open fabric sacks to allow the percolation of air and sunlight through the onions, and then leaving the sacks in segregated relation for a length of time sufficient to allow the onions to cure.

3. The herein described method of harvesting onions consisting in topping and derooting the onions while they are still in the ground and the tops are still green, then removing the onions from the ground, placing them in foraminous containers whereby the sunlight and air may circulate through the onions within the containers, and placing the containers in segregated relation and open to the elements for a length of time sufficient to cure and dry the onions therein.

4. That method of harvesting and curing onions which comprises the steps of topping the onions while they are in the ground and the tops are still green, removing the topped onions from the ground, immediately placing the onions in foraminous containers, placing the filled containers in segregated relation in the open air to subject them individually to the action of light and air currents and leaving them in such relation until the onions are cured and ready for transport and storage.

ROSCOE C. ZUCKERMAN.